United States Patent [19]

Feldman

[11] Patent Number: 4,864,580
[45] Date of Patent: Sep. 5, 1989

[54] $CO_2$ LASER PULSE OPTIMIZATION FOR HARMONIC GENERATION

[75] Inventor: Barry J. Feldman, Arlington, Va.

[73] Assignee: The United States of America as represented by the Secretay of the Navy, Washington, D.C.

[21] Appl. No.: 24,202

[22] Filed: Mar. 10, 1987

[51] Int. Cl.[4] ............................................. H01S 3/10
[52] U.S. Cl. ........................................ 372/25; 372/33
[58] Field of Search ................ 372/25, 20, 23, 11, 372/19, 33, 30, 29

[56] References Cited

U.S. PATENT DOCUMENTS

| | | | |
|---|---|---|---|
| 3,764,937 | 10/1973 | Skolnick et al. | 372/11 |
| 4,367,552 | 1/1983 | Jacobson | 372/69 |
| 4,435,808 | 3/1984 | Javan | 372/19 |
| 4,484,333 | 11/1984 | Chenausky et al. | 372/64 |
| 4,486,885 | 12/1984 | Genack | 372/26 |
| 4,512,021 | 4/1985 | Chenausky et al. | 372/19 |
| 4,512,021 | 4/1985 | Chenausky et al. | 372/20 |
| 4,660,202 | 4/1987 | Dewhirst et al. | 372/24 |

OTHER PUBLICATIONS

Czuehlewski et al., "Broadband Gas Isolator—$CO_2$ Lasers"; 02/1978; Optics Letters, vol. 2, No. 2; pp. 39-41.
Reynolds et al., "The Trojan High—Laser System"; Conference: Laser Advances and Applications, Proceedings of the Fourth National Quantum Electronics Conference, Edinburgh, Scotland (19–21 Sep. 1979); pp. 35-38.
Harris et al., "Wide-Band Interferometric Tuning of a Multiatmosphere $CO_2$ Laser"; Optics Communications, vol. 16, No. 1, 01/76, pp. 57 62.
Yocom et al.; "A Study of Selective Absorbers for Single Mode Operation of $CO_2$ Tea Lasers"; IEEE Journal of Quantum Electronics, vol. QE 16, No. 11, Nov. 1980, pp. 1192-1194.

Primary Examiner—Frank González
Attorney, Agent, or Firm—Thomas E. McDonnell; Elmer Goshorn

[57] ABSTRACT

A pulsed $CO_2$ laser that eliminates the nitrogen tail on the pulse by placing a Brewster angle absorption cell inside the optical cavity of the laser. This Brewster angle absorption cell contains a gas which exhibits a preferential absorption in the 10 $\mu$m spectral regime. This preferential absorption causes the laser to lase in the 9.6 $\mu$m regime which allows for easier harmonic generation and elimination of the nitrogen tail.

10 Claims, 1 Drawing Sheet

$CO_2$ LASER PULSE OPTIMIZATION FOR HARMONIC GENERATION

BACKGROUND OF THE INVENTION

The present invention is directed to pulsed $CO_2$ lasers, and more particularly to a $CO_2$ laser that eliminates the nitrogen tail from the output pulse of the laser.

The pulsed $CO_2$ laser is a source of laser energy in the 9-11 micron spectral regime. For, most effective performance, the laser operates with an active gaseous mixture consisting predominantly of helium, nitrogen, and $CO_2$. The presence of nitrogen substantially improves the energy output of the laser. $CO_2$ laser pulses utilizing nitrogen in the discharge invariably exhibit a short gain switched spike on the order of one hundred nanoseconds, followed by a long tail on the order of one microsecond resulting from the nitrogen in the mixture. Typically, approximately one half the total pulse energy is contained in this so called "nitrogen tail". If one attempts to remove the nitrogen from the laser gas mix to eliminate the tail (by pumping a $CO_2$ - He mix, for example) the tail disappears but the output energy is reduced by even more than the factor of two because of the degradation of the initial electron distribution that necessarily ensues. Thus, removal of the nitrogen to remove the tail results in substantially degraded laser performance. For applications such as harmonic generation in a nonlinear material where the instantaneous power conversion is a function of the intensity of the laser pulse squared, the nitrogen tail on the laser pulse is of considerable detriment. The "nitrogen tail" introduces additional energy loading on the material which, because of its relatively low intensity, contributes little to the nonlinear energy conversion process. The additional energy loading is undesirable because it leads to additional heating of the nonlinear material and/or its surface or surface coatings and consequently material damage, without contributing in any substantial way to the nonlinear conversion process.

Heretofore, the only means of reducing the nitrogen tail besides the elimination of nitrogen from the laser gas mix as already described, was use optical switch techniques external to the laser cavity to essentially chop off the of the laser pulse. By the use of well-developed electrooptic switching technology such pulse truncation is possible. However, this approach suffers from several drawbacks. Approximately one-half the laser pulse energy is thrown away and the switch is generally made of either CdTe or GaAs which are both difficult crystals to grow. These crystals are also expensive and are limited in available size to roughly one centimeter by one centimeter aperture. In addition, the use of such an optical switch, along with the external electrical switch (spark gap) and associated electronics need, introduces its own damage problems and limitations, so that the damage problem of the nonlinear frequency converter material is transferred more or less to a damage problem of the optical switch itself.

SUMMARY OF THE INVENTION

It is therefore an object of this invention to eliminate the nitrogen tail of the output pulse of a pulsed laser.

It is also an object of this invention to provide for shaping a pulsed laser output.

It is yet a further object of this invention to provide a means of shaping a pulsed laser output that is simple and reliable.

It is still yet a further object of this invention to provide a means of shaping a pulsed laser output that optimizes the energy conversion capabilities for harmonic generation.

Still another object of this invention is to provide for reliable shaping of the shape of a pulsed laser output.

Still another object of this invention is to suppress the buildup of optical radiation in the 10 $\mu m$ spectral regime.

These and other objects are achieved by a Brewster angle absorption cell and a laser cell located along the optical path within the optical cavity of the laser. The absorption cell is filled with a gas that exhibits preferential absorption in the 10 $\mu m$ spectral regime. The suppression of the buildup of optical radiation at these wavelengths eliminated the normal nitrogen tail on the laser pulse.

Other objects, features and advantages of the invention will be apparent to those skilled in the art in the description of the preferred embodiment of the invention as described below and also recited in the appended claims.

DESCRIPTION OF THE PREFERRED EMBODIMENT

Figure 1:
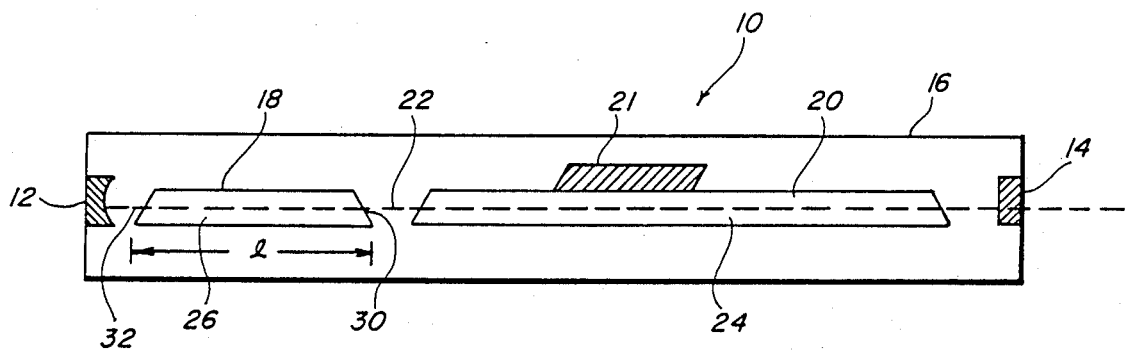
FIG. 1 is a schematic drawing of the side view of the laser of the invention.

Referring to FIG. 1 there is disclosed the laser 10 of the invention. Laser 10 may be a uv preionized $CO_2$ laser, and e-beam preionized $CO_2$ laser, an x-ray preionized $CO_2$ laser, a $CO_2$ isotope laser or a $N_2O$ laser. Laser 10 comprises first and second mirrors 12 and 14 respectively with an optical resonant cavity 16 therebetween. Mirror 12 is totally reflective and mirror 14 is partially transparent. Absorption cell 18 and laser cell 20 are disposed within optical cavity 16 along an optical path 22. Absorption cell 18 and laser cell 20 can be of any suitable shape such as rectangular or cylindrical. Cell 18 and cell 20 are located anywhere and in any order along optical path 22 as long as absorption cell 18 does not physically obstruct laser cell 20. Cell 18 may be made be as large as the or width of laser 10 and the length of cell 18 is not critical.

Laser cell 20 has windows 34 and 36 and is filled with a laser medium or active gaseous mixture 24 typically comprising helium, nitrogen and $CO_2$. The presence of nitrogen modifies the electron energy distribution within laser 10 discharge for efficient gas pumping and serves as an efficient energy storage and transfer medium to excite $CO_2$ molecules to vibrational states from which the $CO_2$ molecule lases. A conventional pump 21 excites the molecules in laser medium 24. The output pulse of laser 10 exhibits a long tail of duration on the order of a one mircrosecond in addition to the short "gain switched" pulse on the order of 100 nanoseconds. The long tail arises due to the nitrogen in laser medium 24 and the short "gain switch" pulse arises due to the $CO_2$ in laser medium 24.

Absorption cell 18 has windows 32 and 30 that are made of a material that transmit light in the 10 μm regime such as sodium chloride. Windows 32 and 30 are inclined at Brewster's angle thereby eliminating reflection of any laser light. Windows 32 and 30 may be made of the same material as windows 34 and 36 of laser cell 20 so that the introduction of cell 18 does not affect the energy level with which laser 10 can operate safely to avoid damage to windows 32 and 30. Cell 18 is made of any suitable material such as glass, pirex, aluminum or plastic and contains a gas mixture 26 which exhibits preferential absorption in the 10 μm spectral regime. This causes higher absorption in cell 18 at the higher gain 10.6 micron $CO_2$ transitions than the absorption in the lower gain 9.6 μm $CO_2$ transitions. There are innumerable gases which demonstrate this behavior, such as sulfur hexafluoride ($SF_6$) and boron trichloride ($BCl_3$). By introducing absorption into optical cavity 16 in the 10.6 μm regime the build up of optical radiation at these wavelengths is suppressed. Lower gain optical radiation in the 9.6 μm regime, may build up within optical cavity 16 thereby resulting in frequency shifting of the output laser 10 thus, allowing fine tuning of laser 10 without the use of frequency selective optics such as gratings, etalons, interferometers, or prisms. Lasing in the 9.6 μm regime promotes harmonic generation in the 4.8 μm regime whereas lasing in the 10.6 μmicron (mn) regime promotes harmonic generation in the 5.3 μm regime. Harmonic generation in the lower 4.8 μm regime is preferable for many applications because light of that wavelength transmits easily through the atmosphere. With variation in the absorption gas pressure in absorption cell 18 the lower gain laser transitions can be made to lase at the expense of the higher gain transitions. A typical pressure for performing this function is, for example a few torr for strong absorbers, such as $SF_6$ or $BCl_3$ in a 40 cm absorption cell with a 1 meter laser cell.

Figure 2:
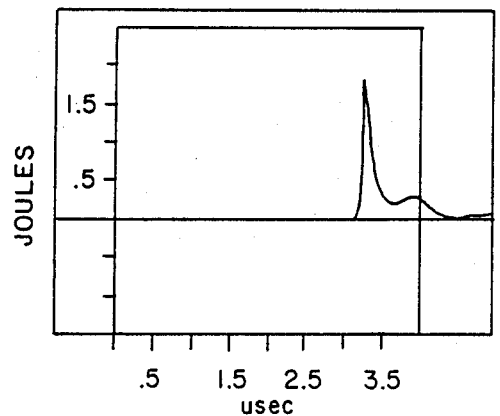
FIG. 2 is a graphical representation of scope traces of the output pulse shape of a typical $CO_2$ laser.
Figure 3:
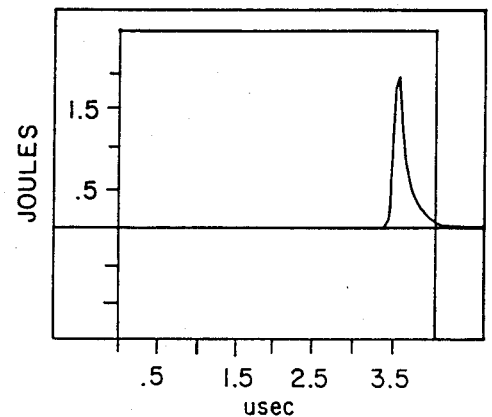
FIG. 3 is a graphical representation of scope traces of the output pulse shape of the laser of the invention.

More importantly, the addition of absorption cell 18 within the optical cavity 16 results in a substantial diminishment of the normal nitrogen tail on the pulse of laser 10. FIG. 2 is a graphical representation of scope traces of the output pulse shape with no gas mixture 26 in cell 18 and FIG. 3 is a graphical representation of scope traces of the output pulse shape with the gas mixture 26 in cell 18. The nitrogen tail begins at 3.5 micro-second in FIG. 2. With a few torr of $SF_6$ in absorption cell 18 the pulsed output of laser 10 is delayed by about 0.5 microsecond as depicted in FIG. 3 The pulse energy in both cases is the same to within 10%. The gas mixture 26 in cell 18 retards the buildup of the laser pulse by about 0.5 microsecond, and thus suppresses the early laser oscillation which arises form direct electron pumping of the $CO_2$ molecule. The delay allows the nitrogen to $CO_2$ energy transfer to occur before laser 10 has had a chance to turn on. The total energy in the pulse remains essentially unchanged since the storage time (or lifetime) of the upper laser state of the $CO_2$ molecule is longer than one microsecond. Therefore, the output pulse still contains the energy pumped into the $CO_2$ molecule by the electrons as well as the energy transferred from the nitrogen to the $CO_2$.

Cell 18 is a simple device which introduces no additional complexities, to the operation of laser 10. Furthermore, little or no energy is lost by placing cell 18 in optical cavity 16.

Obviously, many modifications and variations of the present invention are possible in light of the above teachings. It is therefore to be understood that within the scope of the appended claims the invention may be practiced otherwise than as specifically described.

I claim:

1. In a $CO_2$ laser providing a pulsed spike laser output without a nitrogen tail and having an optical resonant cavity, the optical resonant cavity having opposed ends and an optical path extending therebetween, first and second mirrors disposed at the opposed ends, the second mirror for transmitting a laser pulsed output, the optical resonant cavity providing a laser cell and an absorption cell, the laser cell having an active gaseous mixture therein, the laser and absorption cells being arranged in the optical resonant cavity along the optical path in spaced relation to each other and from the first and second mirrors, the active gaseous mixture of the laser cell containing nitrogen gas, the absorption cell having an absorption gas medium at relatively low pressure, an excitation device disposed in operative relation to the laser cell, the improvement comprising:

the absorption gas medium of the absorption cell having the characteristic of absorbing the radiating excited active gaseous mixture of the laser cell in the 10.6 micron spectral regime when the laser cell is lasing, the absorption gas medium also causing an initial delay in the lasing of the excited active gaseous mixture of the laser cell so as to initially effect transfer of energy from the excited nitrogen gas of the active gaseous mixture to at least another excited gas of the active gaseous mixture and after the initial delay the absorption cell permitting the lasing of the delayed and excited active gaseous mixture of the laser cell so as to enable radiating thereof in both the 9.6 and 10.6 spectral regimes within the optical resonant cavity so that a delayed and optimum pulsed spike laser output is provided by the laser for harmonic conversion processes in the 9.6 micron spectral regime without a nitrogen tail and without any significant reduction in the gain of the pulsed spike output as the absorption cell within the optical resonant cavity absorbs the radiating and excited active-gaseous mixture of the laser cell in the 10.6 micron spectral regime all when the exciting device excites the active gaseous mixture of the laser cell during the $CO_2$ laser use.

2. In a laser as set forth in claim 1 wherein the active gaseous mixture of the laser cell consists essentially of carbon dioxide, helium and nitrogen.

3. In a laser as set forth in claim 1 wherein the active gaseous mixture of the laser cell consists essentially of nitrous oxide and nitrogen.

4. In a laser set forth in claim 1 wherein the absorption gas medium consists of sulfur hexafluoride at a relatively low pressure on the order of a few torr.

5. In a laser as set forth in claim 1 wherein the absorption gas medium consists of boron trichloride at a relatively low pressure on the order of a few torr.

6. In a method for removing a nitrogen pulse tail from a pulsed spike laser output of a $CO_2$ laser so as to optimize the pulsed spike laser output for harmonic conversion, a $CO_2$ laser having an optical resonant cavity, the optical resonant cavity having opposed ends and an optical path extending between the opposed ends and therebeyond, a laser cell and an absorption cell disposed along the optical path in the optical resonant cavity such that the laser cell and the absorption cell are disposed in spaced relation to each other and to the opposed ends of the optical resonant cavity and such that one of the opposed ends is provided with a mirror for transmitting a pulse spike laser output along the optical path, the laser cell having an active gaseous mixture that contains nitrogen gas, an excitation device operatively associated with the laser cell for exciting the active gaseous mixture of the laser cell during the $CO_2$ laser use, the absorption cell having an absorption gas medium at relatively low pressure, the absorption gas medium having the characteristics of being transparent to a 9.6 micron spectral regime but absorption to a 10.6 micron spectral regime, the absorption gas medium also causing an initial delay in the lasing of the excited active gaseous mixture of the laser cell, the improvement comprising the steps of:

initially delaying the lasing of the active gaseous mixture of the laser cell as effected by the absorption gas medium of the absorption cell when the active gaseous mixture of the laser cell is initially excited by the excitation device so as to enable free energy transfer from the excited nitrogen gas of the active gaseous mixture to at least another active gas thereof, and resonating of the lasing and radiating excited active gaseous mixture of the laser cell within the optical resonant cavity after the initial delay of the lasing of the excited active gaseous mixture so as to provide more than one spectral regime therewithin in order that an optimum pulsed spike laser output in the 9.6 micron spectral regime for harmonic conversion processes is provided without any significant reduction in the gain of the output and without any nitrogen tail thereof while at the same time the absorption gas medium of the absorption cell absorbs the radiation in the 10.6 micron spectral regime of the lasing and excited active gaseous mixture.

7. In a method as set forth in claim 6 wherein the step of delaying is effected by the absorption gas medium consisting of sulfur hexafluoride at a relatively low pressure on the order of a few torr.

8. In a method is set forth in claim 6 wherein the step of delaying is effected by the absorption gas medium consisting of boron trichloride at a relatively low pressure on the order of a few torr.

9. In a method as set forth in claim 6 wherein the method step of resonating is effected by the active gaseous mixture of the laser cell consisting essentially of carbon dioxide, helium and nitrogen.

10. In a method as set forth in claim 6 wherein the step of resonating is effected by the active gaseous mixture of the laser cell consisting essentially nitrous oxide and nitrogen.

* * * * *